(12) United States Patent
Son et al.

(10) Patent No.: US 9,654,561 B2
(45) Date of Patent: May 16, 2017

(54) INTEGRATED CLOUD STORAGE SERVICE THROUGH HOME GATEWAY

(71) Applicant: KT CORPORATION, Gyeonggi-do (KR)

(72) Inventors: Eui-Seung Son, Incheon (KR); Se-Jin Park, Gyeonggi-do (KR); Yu-Seon Kim, Seoul (KR); Ho-Sung Yoon, Daejeon (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/530,917

(22) Filed: Nov. 3, 2014

(65) Prior Publication Data

US 2015/0128215 A1 May 7, 2015

(30) Foreign Application Priority Data

Nov. 1, 2013 (KR) .................... 10-2013-0132304

(51) Int. Cl.
*H04L 29/00* (2006.01)
*H04L 29/08* (2006.01)
*H04L 29/06* (2006.01)

(52) U.S. Cl.
CPC ........ *H04L 67/1097* (2013.01); *H04L 63/102* (2013.01)

(58) Field of Classification Search
CPC combination set(s) only.
See application file for complete search history.

(56) References Cited

U.S. PATENT DOCUMENTS

| 2008/0005168 | A1 | 1/2008 | Huff et al. |
| 2010/0325199 | A1 | 12/2010 | Park et al. |
| 2012/0166538 | A1 | 6/2012 | Son et al. |
| 2012/0192263 | A1* | 7/2012 | Lin ..................... H04L 67/1097 726/12 |
| 2013/0238553 | A1 | 9/2013 | Kim et al. |
| 2014/0075583 | A1* | 3/2014 | Martin ................... G06F 21/10 726/31 |
| 2014/0136600 | A1* | 5/2014 | Kao .................. G06F 17/30067 709/203 |

(Continued)

FOREIGN PATENT DOCUMENTS

| KR | 10-2005-0095568 A | 9/2005 |
| KR | 10-0871818 B1 | 12/2008 |

(Continued)

*Primary Examiner* — Ghazal Shehni
(74) *Attorney, Agent, or Firm* — IP Legal Services, LLC

(57) ABSTRACT

Provided is a method of providing an integrate cloud storage service through a home gateway communicating with smart devices through a first network formed by the home gateway and communicating with cloud storages through a communication network. The method may include obtaining information on cloud storage accounts associated with a smart device, as cloud storage account information, upon generation of a predetermined event associated with the smart device, generating an integrated cloud storage list based on information on folders and data of cloud storages accessible by the cloud storage account information, and providing the generated integrated cloud storage list to the smart device.

20 Claims, 11 Drawing Sheets

(56) References Cited

U.S. PATENT DOCUMENTS

| | | | | |
|---|---|---|---|---|
| 2014/0157378 A1* | 6/2014 | Childs | ............... | H04L 63/102 726/6 |
| 2014/0223516 A1* | 8/2014 | Vongsouvanh | ..... | H04L 63/0492 726/4 |
| 2015/0032811 A1* | 1/2015 | Kuo | ............... | H04L 67/20 709/204 |
| 2015/0199379 A1* | 7/2015 | Thierer | ............... | G06F 17/301 707/724 |

FOREIGN PATENT DOCUMENTS

| | | | |
|---|---|---|---|
| KR | 10-2009-0024179 | A | 3/2009 |
| KR | 10-2010-0137323 | A | 12/2010 |
| KR | 10-2011-0038909 | A | 4/2011 |
| KR | 10-2012-0072022 | A | 7/2012 |
| KR | 10-2012-0073799 | A | 7/2012 |
| KR | 10-2013-0053070 | A | 5/2013 |
| KR | 10-2013-0064292 | A | 6/2013 |

\* cited by examiner

FIG. 2

<Cloud storage usage information>

| 21 | 22 | 23 | 24 | 25 | 26 |
|---|---|---|---|---|---|
| Sequence No | Usage time | Device information | Home gateway access information | Cloud storage access information | Cloud storage usage information |

FIG. 3

<Integrated cloud storage list>

| 31 | 32 | 33 | 34 | 35 | 36 |
|---|---|---|---|---|---|
| Cloud storage name | Folder name | Folder permission | Data name | Data type | Data permission |
| First cloud storage | First folder 1-1 | All user | First data 1-1-1 | Music | All user |
| First cloud storage | First folder 1-1 | All user | Second data 1-1-2 | Picture | All user |
| First cloud storage | Second folder 1-2 | First user | First data 1-2-1 | Document | First user |
| First cloud storage | Second folder 1-2 | First user | Second data 1-2-2 | Video | First user |
| First cloud storage | Third folder 1-3 | Adult user | First data 1-3-1 | Video | Adult user |
| First cloud storage | Third folder 1-3 | Adult user | Second data 1-3-2 | Video | First user |
| Second cloud storage | First folder 2-1 | All user | First data 2-1-1 | Music | All user |
| Second cloud storage | Second folder 2-2 | Second user | Second data 2-2-1 | Picture | Second user |

FIG. 4
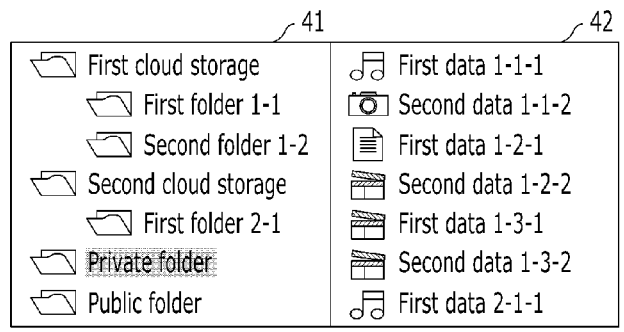
(a)
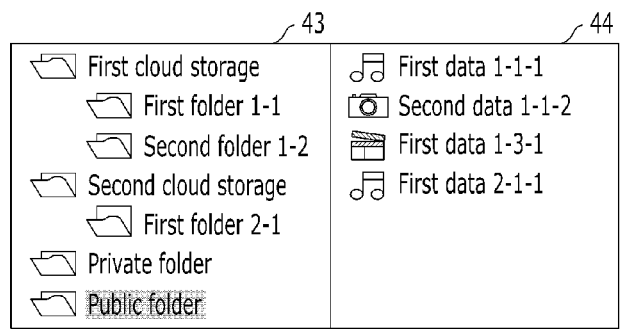
(b)
FIG. 5
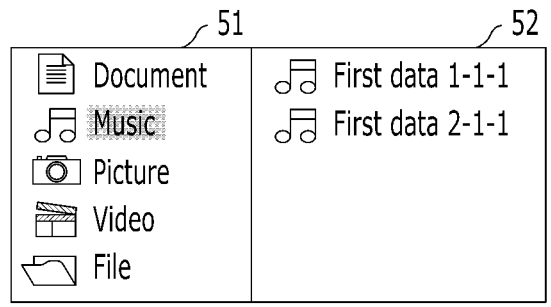

INTEGRATED CLOUD STORAGE SERVICE THROUGH HOME GATEWAY

CROSS REFERENCE TO PRIOR APPLICATIONS

The present application claims priority under 35 U.S.C. §119 to Korean Patent Application No. 10-2013-0132304 (filed on Nov. 1, 2013).

BACKGROUND

A cloud storage service allows users to use storage spaces scattered over a network, as a personal storage space. Such a cloud storage service provides many convenient features to a user, such as a large storage capacity, no limitation of a physical location, easy data accessibility, and so forth. In order to use the cloud storage services, users need to enter a cloud storage address on a web-browser or install cloud applications on their smart devices. Moreover, users need to enter user account information including user identification or password for connecting to the cloud storages. If a user wants to share data stored in the cloud storages, the user needs to first download the data to a personal computer (PC) or smart devices. The user then shares the data downloaded to his or her PC or smart devices by transferring the data with an external hard-drive or through the Internet.

In order to eliminate such cumbersome steps of downloading data before sharing with other users, the cloud storage service can allow users to create a folder for sharing, assign other users who can access the folder, and share data with other users using the shared folder. However, this type of sharing service can only be provided to users using same cloud storage service. Users using a cloud storage service cannot access the data stored and shared in another cloud storage service.

Such a cloud storage service may not be implemented with household devices (e.g., dummy device) in capable of interacting with a web-browser or an application for the cloud storage services. Data stored in the household devices cannot be stored directly in a cloud storage through the cloud storage services. Accordingly, a user must transfer the data stored in the household devices to the PC and move the data in the cloud storages through the Internet.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with at least one aspect of the present invention, an integrated cloud storage service may be provided through a home gateway to a plurality of users with or without a cloud storage user account and/or a home gateway user account.

In accordance with another aspect of the present invention, an integrated cloud storage service may enable a user to integrally use a plurality of cloud storages each provided by different service providers.

In accordance with still another aspect of the present invention, the integrated cloud storage service may enable a dummy device incapable of interacting with an application or a web browser for a cloud computing service to store data to and/or to fetch data from a plurality of cloud storages.

In accordance with at least one embodiment, a method may be provided for providing an integrate cloud storage service through a home gateway communicating with smart devices through a first network formed by the home gateway and communicating with cloud storages through a communication network. The method may include obtaining information on cloud storage accounts associated with a smart device, as cloud storage account information, upon generation of a predetermined event associated with the smart device, generating an integrated cloud storage list based on information on folders and data of cloud storages accessible by the cloud storage account information, and providing the generated integrated cloud storage list to the smart device.

The obtaining information on cloud storage accounts associated with a smart device may include obtaining information on the smart device as device information and information on a home gateway account as home gateway account information upon receipt of an access request from the smart device and fetching the cloud storage account information mapped to at least one of the device information and the home gateway account information from a memory.

The obtaining information on cloud storage accounts associated with a smart device may include requesting home gateway account information to the smart device upon receipt of an integrated cloud storage service request from the smart device, receiving the home gateway account information from the smart device in response to the request, and fetching cloud storage account information mapped to the received home gateway account information from a memory. The received home gateway account information may be different from home gateway account information mapped to device information of the smart device.

The obtaining information on cloud storage accounts associated with a smart device may include requesting the smart device to provide the cloud storage account information upon receipt of an access request from the smart device and receiving the cloud storage account information from the smart device in response to the request.

The obtaining information on cloud storage accounts associated with a smart device may include determining whether the smart device has a home gateway account registered at the home gateway upon receipt of an access request, providing a guest account to the smart device in cooperation with an administrator smart device when the smart device has no home gateway account, and obtaining information on cloud storage accounts mapped to other smart devices having home gateway accounts registered at the home gateway from a memory as guest cloud storage account information.

The generating may include accessing cloud storages based on the guest cloud storage account information, collecting information on folders and data set with an access permission to allow anyone to access from the accessed cloud storages, and generating an integrated cloud storage list for a guest account to include the folders and data set with an access permission to allow anyone to access based on the collected information.

The generating may include accessing cloud storages based on the obtained cloud storage account information, selecting, from the accessed cloud storages, folders and data associated with an account holder of the accessed cloud storages, collecting information on the selected folders and data, and generating an integrated cloud storage list to include the selected folders and data based on the collected information.

The selecting folders and data may include selecting, from the accessed cloud storages, folders and data each having an access permission set to allow anyone to access and selecting, from the accessed cloud storages, folders and data each having an access permission set to allow the account holder of the accessed cloud storages.

The integrated cloud storage list may include information on at least one of a cloud storage name, a folder name, a folder permission, a data name, a data type, and a data permission of each folders and data of cloud storages accessible by the cloud storage account information.

The method may further include receiving a user control request from the smart device after the providing the integrated cloud storage list, requesting at least one cloud storage to perform an operation based on the received user control request, receiving a response message from the at least one cloud storage as a result of performing the operation in response to the user control request, updating the integrated cloud storage list based on the response message, and transmitting a result message to the at least one smart device as a result of performing the requested operation.

In accordance with another embodiment, a home gateway may be provided for providing an integrate cloud storage service. The home gateway may be configured to obtain information on cloud storage accounts associated with a smart device, as cloud storage account information, upon generation of a predetermined event associated with the smart device, to generate an integrated cloud storage list based on information on folders and data of cloud storages accessible by the cloud storage account information, and to provide the generated integrated cloud storage list to the smart device.

BRIEF DESCRIPTION OF THE DRAWINGS

The above and/or other aspects of the present invention will become apparent and more readily appreciated from the following description of embodiments, taken in conjunction with the accompanying drawings, of which:

FIG. 2 illustrates cloud storage usage information in accordance with at least one embodiment;

FIG. 3 illustrates an integrated cloud storage list in accordance with at least one embodiment;

FIG. 4 illustrates an integrated cloud storage list displayed on a graphic user interface of a smart device in accordance with at least one embodiment;

FIG. 5 illustrates an integrated cloud storage list displayed on a graphic user interface of a smart device in accordance with at least one embodiment;

DESCRIPTION OF EMBODIMENTS

Figure 1:
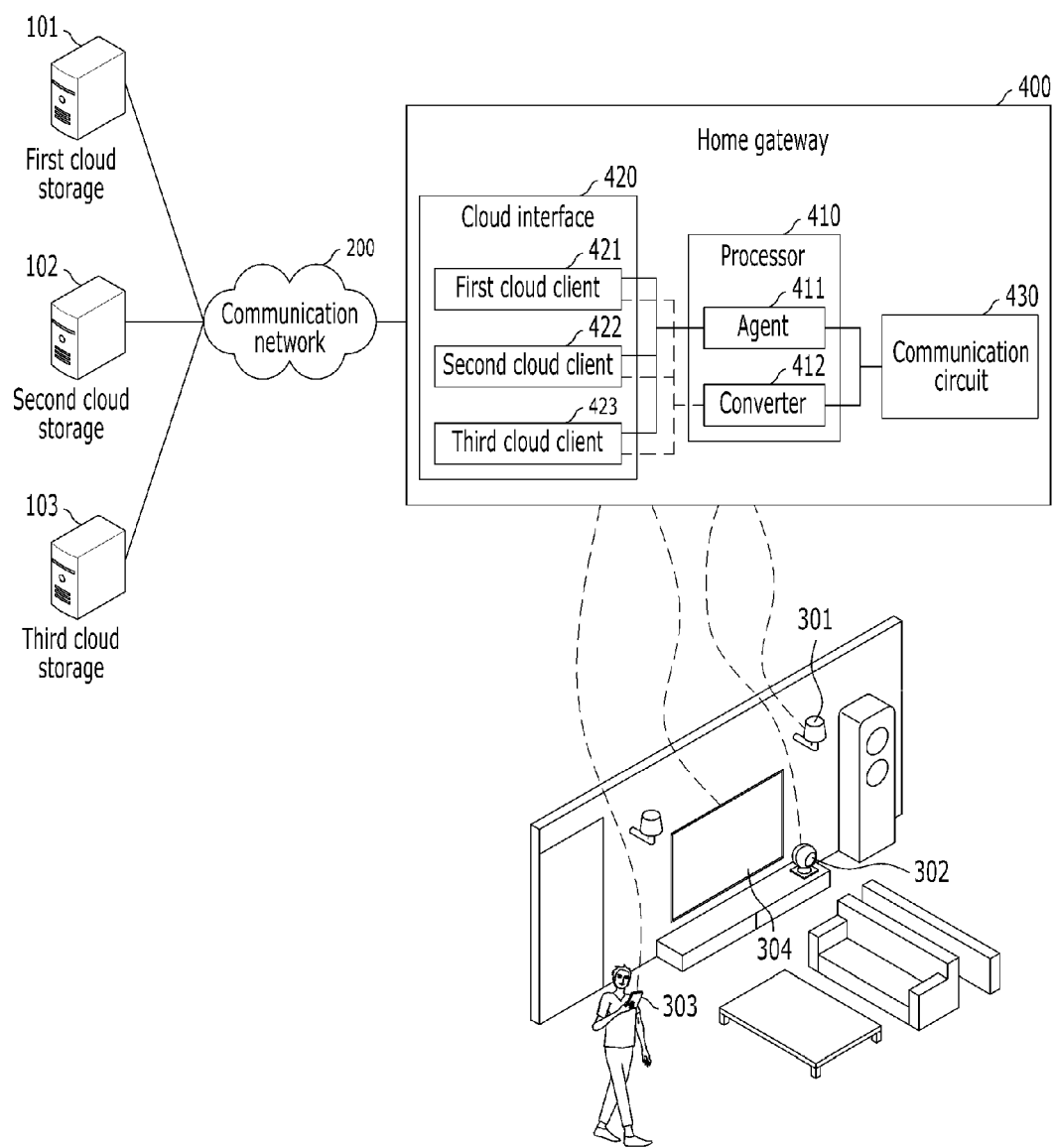
FIG. 1 illustrates an integrated cloud storage service provided through a home gateway in accordance with at least one embodiment.

Reference will now be made in detail to embodiments of the present disclosure, examples of which are illustrated in the accompanying drawings, wherein like reference numerals refer to like elements throughout. The embodiments are described below, in order to explain the present invention by referring to the figures.

In accordance with at least one embodiment, an integrated cloud storage service may be provided through a home gateway to a plurality of users with or without a cloud storage user account and/or a home gateway user account. Furthermore, such an integrated cloud storage service may enable a user to integrally use a plurality of cloud storages each provided by different service providers. In addition, the integrated cloud storage service may enable a dummy device incapable of interacting with an application or a web browser for a cloud computing service to store data to and/or to fetch data from a plurality of cloud storages. Hereinafter, such an integrated cloud storage service in accordance with at least one embodiment will be described with reference to FIG. 1.

FIG. 1 illustrates an integrated cloud storage service provided through a home gateway in accordance with at least one embodiment.

Referring to FIG. 1, home gateway 400 is coupled to a plurality of cloud storages 101 to 103 through communication network 200. Such home gateway 400 forms a local area network coupled with a plurality of smart devices 301 to 305 in accordance with at least one embodiment. In particular, home gateway 400 is coupled to a plurality of smart devices 301 to 304 through a local area network and manages and controls smart devices 301 to 304 to perform predetermined operations with minimum interaction of an associated user. Each of cloud storages 101 to 103 may be managed and controlled by respective service provider. In particular, each one of cloud storages 101 to 103 may include and manage at least one of cloud storage spaces and provide a cloud storage service to registered users who are registered for a cloud storage service and issued with a cloud storage user account. A plurality of smart devices 301 to 304 may be connected to home gateway 400 and may communicate with cloud storages 101 to 103 through home gateway 400. That is, the plurality of smart devices 301 to 304 may be interact with cloud storages 101 to 103 through home gateway 400 to store data to or to retrieve data from cloud storages 101 to 103 in response to a corresponding user's control. The plurality of smart devices 301 to 304 include a dummy device that might communicate with home gateway 400 but is incapable of interacting with a plurality of cloud storages, such as incapable of interacting with a web-browser and/or an application for a cloud service storage service In accordance with at least one embodiment, each of cloud storages 101 to 103 may provide a cloud storage service to users (e.g., smart devices 301 to 304) via home gateway 400 with minimum interaction of an associated user or without interaction of an associated user. For example, cloud storage 101 may receive an access request associated with a smart device from home gateway 400 via communication network 200. Cloud storage 101 may authenticate a cloud storage user account included in the access request from home gateway 400, allow the smart device to access cloud storages 101 to 103 through home gateway 400, and enable the smart device to user the cloud storage services provided from cloud storages 101 to 103 through home gateway 400.

In particular, the integrated cloud storage service in accordance with at least one embodiment may enable smart devices including a dummy device to: i) download data stored in cloud storages 101 to 103 to itself, to other smart device, or to other cloud storage; ii) upload data stored in itself, in other smart device, or in other cloud storage to a designated cloud storage; iii) create a new folder in a predetermined cloud storage; iv) move folders between cloud storages; v) change names of folders in cloud storages; vi) change properties (e.g., access permission) of folders in cloud storages; vii) delete folders in cloud storages; viii) change properties (e.g., access permission) of data in a cloud storage, and/or ix) delete data in a cloud storage. The present invention, however, is not limited thereto.

Home gateway 400 may connect smart devices 301 to 304 to cloud storages 101 to 103 via communication network 200. Home gateway 400 may form a local area network for a predetermined area (e.g., a residence unit or an office unit) and provide a smart automation service to associated users by managing and controlling smart devices 301 to 304 coupled to the local area network. For example, home gateway 400 may connect the local area network to a wide area network, allow smart devices 301 to 304 to communicate other entities not only in the local area network but also in the wide area network, collect information captured by smart devices 301 to 304, analyze the collected information and perform predetermined operations through smart devices 301 to 304 to provide a predetermined smart automation service to associated users, and manage and control smart devices 301 to 304 to perform predetermined operations to provide the smart automation service to the associated users.

Communication network 200 may include a Wide Area Network (WAN), a Value Added Network (VAN), a mobile network, and/or a satellite network. The present invention, however, is not limited thereto.

As described, smart devices 301 to 304 may be connected to home gateway 400 through a local area network formed by home gateway 400, managed and controlled by at least one of home gateway 400 and an associated user, and perform predetermined operations in cooperation with home gateway 400 to provide a smart automation service. In accordance with at least one embodiment, smart devices 301 to 304 may be connected to the Internet via home gateway 400 and be enabled to have various cloud computing services including cloud storage services from cloud storages 101 to 103 through home gateway 400.

Smart devices 301 to 304 may include a variety of computing devices. The computing devices may include a Personal Computer (PC), a smart phone, a tablet-PC, a smart-pad, a notebook-PC, Personal Digital Assistant (PDA), user equipment, and/or a smart-television. Smart devices 301 to 304 may also include a variety of household devices (e.g., home appliances). The household devices may include a light bulb, a voltmeter, a thermostat, a laundry machine, a refrigerator, an air conditioner, a humidifier, and/or a dehumidifier. The present invention, however, is not limited thereto.

Such household devices are dummy devices incapable of interacting with web-browsers or applications of a cloud computing service (e.g., cloud storage service) of cloud storages 101 to 103. In accordance with at least one embodiment, home gateway 400 enables such dummy devices to interact with cloud storages 101 to 103, for example, to access multiple cloud storages 101 to 103 and to utilize services (e.g., cloud storage services) provided from cloud storages 101 to 103. For example, home gateway 400 may enable smart devices 301 to 304 including the dummy devices to: i) download data stored in cloud storages 101 to 103 to itself, other smart devices, or to another cloud storage; ii) upload data stored in itself, in other smart devices, or another cloud storage to a cloud storage; iii) create a new folder in a cloud storage; iv) move folders between cloud storages; v) change names of folders in cloud storages; vi) change properties (e.g., access permission) of folders in cloud storages; vii) delete folders in cloud storages; viii) change properties (e.g., access permission) of data in a cloud storage, and/or ix) delete data in a cloud storage. Home gateway 400 may enable dummy devices to transfer data with cloud storages 101 to 103 via home gateway 400. That is, the dummy devices may send collected or stored data to home gateway 400 and home gateway 400 may send data received from the dummy devices to predetermined cloud storages 101 to 103. In addition, the dummy devices may receive data stored in cloud storages 101 to 103 via home gateway 400.

Home gateway 400 may form a smart automation network with smart devices 301 to 304 and allow smart devices 301 to 304 to access cloud storages 101 to 103 via communication network 200. That is, home gateway 400 may provide an integrated cloud storage service to smart devices 301 to 304 including a dummy device in accordance with at least one embodiment. In particular, home gateway 400 may store and manage information on cloud storage user accounts of users registered at home gateway 400. Such cloud server user account information may include information for authentication, a cloud server user account, and a password of each user for accessing cloud storages 101 to 103. Home gateway 400 may access cloud storages 101 to 103 using the stored cloud storage user account information for smart devices 301 to 304 and provide a cloud storage service to smart devices 301 to 304. That is, smart devices 301 to 304 may be enabled to access cloud storages 101 to 103 and to utilize cloud storage services through home gateway 400.

In accordance with another embodiment, home gateway 400 may manage a plurality of cloud storage user accounts of different cloud storages associated with a user or a smart device and integrate the cloud storage user accounts as one integrated user account. For example, smart devices 301 to 304 may be enabled to access data stored in different cloud storages through home gateway 400 without accessing each cloud storage separately. Smart devices 301 to 304 may be enabled to access a sharing folder (e.g., public folder) in any cloud storages without a corresponding cloud storage user account through home gateway 400. That is, home gateway 400 may enable smart devices 301 to 304 incapable of interacting with web-browsers or applications for accessing and cooperating with cloud storages 101 to 103 in accordance with at least one embodiment.

Such home gateway 400 may include processor 410, cloud interface 420, and communication circuit 430. Cloud interface 420 may include first cloud client 421, second cloud client 422, and third cloud client 423. Processor 410 may include agent 411 and converter 412.

Agent 411 of processor 410 may store information on at least one of cloud storage user accounts of users registered at home gateway 400 in order to use the stored cloud storage user account information for accessing cloud storages 101 to 103. Agent 411 may provide such stored cloud storage user account information to cloud interface 420.

Agent 411 may store information on a smart device and/or a user mapped to a corresponding cloud storage user account. Such mapping information may be used for smart devices 301 to 304 to access to corresponding cloud storages 101 to 103 based on the stored cloud storage user account information. For example, when one of smart devices 301 to 304 access home gateway 400, agent 411 may obtain cloud storage user account information mapped to the smart device and send the obtained cloud storage user account information to cloud interface 420.

In particular, agent 411 may determine whether cloud storage user account information mapped to the connected smart device is stored in a memory. When the cloud storage user account information mapped to the connected smart device is stored in the memory, the connected smart device may be granted with full access to cloud storages 101 to 103. On the other hand, when the cloud storage user account information mapped to the connected smart device is not stored in the memory, the connected smart device may be granted with limited access to cloud storages 101 to 103. Such limited access might allow the connected smart device to access only shared folders (e.g., public folder) in cloud storages.

Agent 411 may obtain cloud storage usage information of each smart device. Such cloud storage usage information may include information on smart devices 301 to 304 connected to home gateway 400, cloud storage user accounts related to connected smart devices 301 to 304, time spent on cloud storages 101 to 103, sequence number, and/or cloud storage user accounts used to grant an access to cloud storages 101 to 103. The present invention, however, is not limited thereto. Such cloud storage usage information may be used to determine which person used cloud storages 101 to 103, when or how long a person used cloud storages 101 to 103, and/or types of data transferred during accessing cloud storages 101 to 103.

Moreover, agent 411 may store information on home gateway accounts of users registered at home gateway 400. Agent 411 may map such home gateway account information of each user with information on at least one corresponding cloud storage user account and store such mapping relation in a memory. The home gateway user account may include user authentication information used to connect associated smart devices to home gateway 400. When a smart device accesses home gateway 400, agent 411 may receive home gateway user account information of a user of the smart device, obtain cloud storage user account information associated with the received home gateway account information from a memory, and transfer the obtained cloud storage user account information to cloud interface 420. Agent 411 may collect information on a history of using cloud storages 101 to 103 in association with the user and/or the smart device.

Such mapping information between home gateway user accounts and cloud storage user account information enables home gateway 400 to access cloud storages based on information on a user instead of information on a smart device. Such mapping information may be useful when a person uses a smart device owned by other persons. For example, a father might not use his smartphone to access home gateway 400. Sometimes, he might use his wife's smartphone or his son's smartphone to access home gateway 400 to perform a predetermined operation. In this case, home gateway 400 may receive a home gateway account of father and fetch cloud storage user account information mapped to the received home gateway account. Based on the cloud storage user account information, home gateway 400 enables the smart device to access corresponding cloud storages. Accordingly, father can still be able to access his cloud storage although he uses his wife's smartphone to access home gateway 400.

Agent 411 may provide an integrated cloud storage list. For example, agent 40 may collect information on folders or data scattered across cloud storages associated with a corresponding user. Agent 411 may further collect information on folders and data shared by other users. Agent 411 may generate an integrated cloud storage list based on the collected information. For example, agent 411 may generate an integrated cloud storage list including the collected folder and data information, and send the created integrated cloud storage list to cloud interface 420. Smart devices 301 to 304 may receive the integrated cloud storage list from cloud interface 420 upon the access of home gateway 400.

Cloud interface 420 may access a predetermined cloud storage in response to control of agent 411, obtain folder information, data information, and/or data stored in folders, and exchange the obtained information smart devices 301 to 304, In particular, cloud interface 420 may receive cloud storage user account information and cloud storage usage information of cloud storages 101 to 103. Based on the received cloud storage user account information, cloud interface 420 may access cloud storages 101 to 103, receive data from cloud storages 101 to 103, and transfer the received data to smart devices 301 to 304. Cloud interface 420 may receive data from smart devices 301 to 304 and transfer the received data to cloud storages 101 to 103.

Cloud interface 420 may receive an integrated cloud storage list of data and folders from agent 411 and transfer the integrated cloud storage list of data and folders to smart devices 301 to 304 connected to home gateway 400.

In particular, the integrated cloud storage list may include a sharing range and/or an access permission of each folder or data. Accordingly, a smart device accessing home gateway 400 may be allowed to use data in cloud storages based on the sharing range and the access permission.

Agent 411 may store, in cloud storage user account information, information on an access permission (e.g., sharing range) of a folder or data in cloud storages 101 to 103 by each smart device or each user.

When a smart device accesses home gateway 400 with a cloud storage user account associated with the smart device or with a home gateway user account of an associated user, the associated user may be allowed to use cloud storages 101 to 103 based on an access permission set by the smart device or by the user.

The access permission (e.g., a sharing range) may denote a group of users allowed to access a corresponding folder or data. For example, when a folder or data is set with no access permission, any user or any smart device is allowed to access the folder or data. The folder having no access permission set may be a public folder or a sharing folder. When a folder or data is set with an access permission including a set of designated users or designated smart devices, only the designated user or smart devices are allowed to access the folder and data. When a folder or data is set with an access permission including only a user with a cloud access user account of a corresponding cloud storage, only a user with the cloud access user account is allowed to access the folder and data.

Agent 411 may allow users or smart devices to access data stored in unregistered cloud storages in accordance with at least one embodiment. For example, agent 411 allows users or smart devices to use cloud storages registered with other users registered at home gateway 400. Furthermore, agent 411 may allow a guest user to use a public folder, a sharing folder, or a shared data of a cloud storage although the user does not have a cloud storage user account of the cloud storage. The guest user may be a person not permanently registered at home gateway 400, for example, visiting a service area of home gateway 400. When home gateway 400 is installed at a residence, the guest user may be not a family member.

For example, a guest device (e.g., a smart device of a guest user) that does not have a home gateway user account may request a temporal home gateway user account to an administrator device of home gateway 400 (or, home gateway 400). In response to the request, the administrator device of home gateway 400 may temporally register the guest device at home gateway 400, receive a home gateway guest account from home gateway 400, and provide the received home gateway guest account to the guest device. The guest device receives a home gateway guest account from the administrator device and uses the home gateway guest account to access home gateway 400. Home gateway 400 may authenticate the home gateway user account of the guest device when the guest device request to access after providing the home gateway guest account to the guest device. Home gateway 400 may allow the guest device to access based on the authentication result.

When the guest device accesses home gateway 400, home gateway 400 determines that no cloud storage user account is mapped to a home gateway guest account of the guest device. Home gateway 400 selects at least one of stored cloud storage user accounts of other users registered at home gateway 400 and sends the selected at least one of stored cloud storage user accounts to cloud interface 420. Cloud interface 420 may receive the selected cloud storage user account from agent 411 and use the selected cloud storage user account to access cloud storages 101 to 103. Once an access to cloud storages 101 to 103 is established, cloud interface 420 may allow the guest device to use a cloud storage based on cloud storage access information of the guest account.

In accordance with at least one embodiment, agent 411 may receive a dummy device setup signal for storing data stored in a dummy device into a cloud storage. Such a dummy device setup signal may be transmitted from an administrator device of home gateway 400. As described, the administrator device may be a device capable of administrating home gateway 400 or a device owned by an administrator of home gateway 400. Upon the receipt of the dummy device setup signal, agent 411 selects at least one of associated cloud storages and store the data collected from the dummy device to the selected at least one cloud storage. In particular, agent 411 may create a folder in the selected at least one cloud storage to store the data collected from the dummy devices. Agent 411 may designate one of existing folders in the selected at least one cloud storage and store the data collected from the dummy devices. In addition, agent 411 may set an access permission of the selected at least one cloud storage, the designated folder, and/or data.

In accordance with at least one embodiment, agent 411 may consolidate storage space scattered over cloud storages. In order to consolidate, agent 411 may select at least one cloud storage and assign the selected cloud storage as a sharing cloud storage. Such a sharing cloud storage may be set by a user with a cloud storage user account. For example, a cloud storage registered user (e.g., a user having a cloud storage user account) may request agent 411 for setting a sharing storage space in a corresponding cloud storages 101 to 103. Such a sharing cloud storage may be provided to a user accessing home gateway 400 as one virtual integrated or consolidated storage. Agent 411 may provide a virtual integrated cloud storage interface for enabling the user (e.g., smart device) to interact with the integrated storage space.

Cloud interface 420 may control an access permission of a user or a smart device to a cloud storage including an integrated cloud storage (e.g., consolidated cloud storage) and a sharing cloud storage based on information on an access permission of cloud storages 101 to 103 of a user or smart devices 301 to 304 in agent 411.

In FIG. 1, a plurality of cloud clients 421 to 423 are illustrated to be respectively corresponding to a plurality of cloud storage, but the present invention is not limited thereto. For example, one cloud client may be operated as an integrated interface for a plurality of cloud storages.

As described, processor 410 may further include converter 412. Converter 412 may convert file-managing protocols of each cloud storage to a standard file-managing protocol. Accordingly, smart devices 301 to 304 may not need a separate application to control each cloud storage when file-managing protocols of cloud storages are converted to one standard file-managing protocol. The standard file-managing protocol may include Web Distributed Authoring and Versioning (WebDAV), SAMBA, Apple Filing Protocol (AFP), Digital Living Network Alliance (DLNA), and/or Network File System (NFS). The present disclosure, however, is not limited thereto.

Home gateway 400 may further include communication circuit 430. Such communication circuit 430 may form a smart automation network (e.g., home network) with smart devices 301 to 304 through Local Area Network (LAN), Wi-Fi, ZigBee, Power Line Communication (PLC), and/or Personal Area Network (PAN). Communication circuit 430 may convert data traffic from smart devices to Internet traffic. Communication circuit 430 may send and receive Internet traffic between home gateway 400 and cloud storages 101 to 103.

FIG. 2 illustrates cloud storage usage information in accordance with at least one embodiment.

Referring to FIG. 2, agent 411 may collect various type of information of using a cloud storage and store the collected information as cloud storage usage information in home gateway 400. The cloud storage usage information may include sequence number 21, usage time 22, device information 23 (e.g., information on a smart device accessing a home gateway), home gateway access information 24 (e.g., access history of a home gateway), cloud storage access information 25 (e.g., access history of a cloud storage), and cloud storage usage information 26 (e.g., information on using folders and data in a cloud storage). The present invention, however, is not limited thereto.

Sequence number 21 may be a number for managing a message sequence (e.g., information sequence). For example, sequence number 21 may be assigned in order, such as 1, 2, and 3.

Usage time 22 may be information on a time of using or utilizing corresponding cloud storage. For example, the usage time may include information on a time of generating a message, duration of using data stored in a cloud storage, a time of terminating access of cloud storages 101 to 103. Usage time 22 may further include information a date of using corresponding cloud storage.

Device information 23 may be information on a smart devices accessing home gateway 400. Device information 23 may include a name, a device type, an identification number (e.g., or a serial number), a Media Control Access (MAC) address, a manufacturer, and/or an authentication number of a smart device. The present disclosure, however, is not limited thereto.

Home gateway access information 24 may be information on home gateway user accounts used by a user or a smart device to access home gateway 400. For example, when a father of a residence uses his smart phone to connect to home gateway 400, agent 411 may store information on father's home gateway user account.

Such home gateway access information 24 may be used to determine a user using a smart device accessing home gateway 400. That is, when a user uses other person's a smart device to access home gateway 400, home gateway 400 can be aware of a user accessing home gateway 400 based on the home gateway access information.

For example, a person might use his father's smart device to access home gateway 400 and use a corresponding cloud storage. In this case, an administrator of home gateway 400 may use the home gateway access information to identify an actual user who accesses home gateway 400 and uses a corresponding cloud storage and a smart device that the actual user uses to access home gateway 400.

For another example, some smart devices, such as a TV, an audio system, may be frequently and commonly used by a predetermined group of users. In this case, home gateway 400 may identify who uses the TV and which cloud storage is used to download a movie based on the home gateway access information. That is, a corresponding administrator may use the home gateway access information to identify which user has accessed cloud storage.

Cloud storage access information 25 may be information on cloud storage user accounts used to access a cloud storage by a smart device or through home gateway 400.

In accordance with at least one embodiment, home gateway 400 stores cloud storage account information of registered users and smart devices and a user may use someone else's cloud storage user account stored in home gateway 400 to access a corresponding cloud storage. That is, home gateway 400 allows a user without a cloud storage user account to access a cloud storage by using someone else's cloud storage user account. Accordingly, a user associated with a cloud storage user account used to access a corresponding cloud storage may be not a user having a home gateway user account used to access home gateway 400. When a user uses someone else's cloud storage user account stored in home gateway 400 to access a corresponding cloud storage, an administrator or a user of a whose cloud storage user account used to access the corresponding cloud storage can identify an actual user to use the corresponding cloud storage based on the cloud storage access information.

Cloud storage usage information 26 may be information on data transferred between a smart device and a cloud storage. Cloud storage usage information 26 may include information on data uploaded to a cloud storage, data downloaded to a smart device, data and folders deleted from a cloud storage, data and folders transferred between cloud storages, folders created in a cloud storage, and name changes of data and folders in a cloud storage. The present invention, however, is not limited thereto.

FIG. 3 illustrates an integrated cloud storage list in accordance with at least one embodiment.

Referring to FIG. 3, the integrated cloud storage list may include cloud service name 31, folder name 32, folder permission 33, data name 34, data type 35, and data permission 36, but the present invention is not limited thereto. The integrated cloud storage list may be provided to smart devices 301 to 304 connected to home gateway 400. The integrated cloud storage list may vary depending on a user. For example, when a father accesses home gateway 400 using his smart phone, the father may be provided with an integrated cloud storage list different from that provided to his child accessing home gateway 400 using the child's smart phone.

In particular, when a user accesses home gateway 400, home gateway 400 may be configured to generate an integrated cloud storage list based on a user profile. For example, when a father accesses home gateway 400, home gateway 400 may access cloud storages using stored cloud storage user accounts and generate an integrated cloud storage list, and provide the generated integrated cloud storage list to father.

Using the provided integrated cloud storage list, a user accessing home gateway 400 may use data stored not only in the user's own cloud storages but also in other user's cloud storages, registered at home gateway 400 in accordance with at least one embodiment.

Cloud storage name 31 may be a name of a cloud service that provides a cloud storage service to a user. For example, cloud storage name 31 may be S3, a cloud storage service provided by Amazon.com, Inc., Dropbox provided by Dropbox, or Ucloud provided by KT Corporation. Such cloud storage name 31, defined by a service provider, may be used as it is. However, the present invention is not limited thereto. Cloud storage name 31 may be modified or renamed by a corresponding user.

Folder name 32 may be a name of a folder created in cloud storages 101 to 103 by a user. A user may assign any name to a folder and subsequently change the name.

Folder permission 33 may denote a group of users permitted to access a corresponding folder. For example, folder permission 33 may be set to allow only users with associated cloud storage user accounts to access folders in a corresponding cloud storage. Folder permission 33 may be set to allow only a designated user to access folders in a corresponding cloud storage. When folder permission 33 is not set by a user, folder permission 33 may be set to allow only user having a cloud storage user account. Meanwhile, folder permission 33 may be set by a user having authority of a cloud storage use account of a corresponding cloud storage. The user having authority of a cloud storage user account may be a user registered at a cloud storage with the cloud storage user account.

For example, folder permission 33 may be distinct by sex or ages of a user.

When a violent media file is stored in a cloud storage, folder permission 33 may be set to allow only a user who is at least 20 years old to access the media, in order to prevent children from accessing the media. Home gateway 400 may use cloud storage user accounts to identify users who are at least 20 years old.

Data name 34 may be a name of data stored in a cloud storage. For example, when data includes a text file, a media file, or a music file, the data name may be a name of each text file, media file, or music file.

Data type 35 may denote a type of data and a purpose of data. For example, the data type may be used to identify whether data is a text file, a media file, a music file, photo, or etc. A file extension may be used to identify the data type. In accordance with at least one embodiment, home gateway 400 may classify data stored across different folders in a cloud storage by a data type, creates an integrated data type list of the data, and provide the integrated data type list. Furthermore, home gateway 400 may classify data stored across different cloud storages by a data type, creates an integrated data type, and provide the integrate data type list.

Data permission 36 may indicate a group of users permitted to access corresponding data. That is, data permission 36 shows the permitted user to access corresponding data in a folder. For example, data permission 36 may be set to allow users having cloud storage user accounts to access data. Data permission 36 may be set to allow only a designated user to access data. Data permission 36 may be set to allow users permitted to access a folder including a target data to access. A user having authority may be allowed to set data permission 36. The user with an authority may be a user registered at home gateway 400 with a cloud storage user account.

Data permission 36 may be set to be distinguished by sex or ages of users. Home gateway 400 may use cloud storage user accounts to identify sex or an age of a user and determine whether the user is allowed to access data.

Hereinafter, such an integrated cloud storage list will be described in detail with reference to examples in FIG. 3. For convenience and ease of understanding, a first user is assumed as an adult and a second user is assumed as a child. The first user is assumed to only have a cloud storage user account of a first cloud service, and the second user is assumed to only have a cloud storage user account of a second cloud service.

For example, under the assumption above, the integrated cloud storage list in FIG. 3 indicates as follows. Users of home gateway 400 are registered for the first cloud storage and the second cloud storage. The first cloud storage includes a first folder 1-1, a second folder 1-2, and a third folder 1-3. All users are permitted to access the first folder 1-1. The first user is only performed to access the second folder 1-2. Adult users are only performed to access the third folder 1-3.

The first folder 1-1 includes a first data 1-1-1 and a second data 1-1-2. The first data 1-1-1 is a music file and all users are permitted to access the first data 1-1-1. The second data 1-1-2 is a photo and all users are permitted to access the second data 1-1-2.

The second folder 1-2 includes a first data 1-2-1 and a second data 1-2-2. The first data 1-2-1 is a text file, and only the first user is performed to access the first data 1-2-1. The second data 1-2-2 is a media file, and only the first user is permitted to access the second data 1-2-2.

The third folder 1-3 includes a first data 1-3-1 and a second data 1-3-2. The first data 1-3-1 is a media file, and only adult users are permitted to access the first data 1-3-1. The data second 1-3-2 is a media file, and only the first user is performed to access the second data 1-3-2.

The second cloud storage includes a first folder 2-1 and a second folder 2-2. All users are permitted to access the first folder 2-1, and only the second user is permitted to access the second folder 2-2. The first folder 2-1 includes a first data 2-1-1. The first data 2-1-1 is a music file, and all users are permitted to access the first data 2-1-1. The second folder 2-2 includes a first data 2-2-1. The first data 2-2-1 is a photo, and only the second user is permitted to access the first data 2-2-1.

FIG. 4 illustrates an integrated cloud storage list displayed on a graphic user interface of a smart device in accordance with at least one embodiment.

Referring to FIG. 4, diagrams (a) and (b) show a graphic user interface displaying an integrated cloud storage list on a smart device of the first user. Each graphic user interface may include two display windows 41 and 42 or 43 and 44. In the diagrams (a) and (b), windows 41 and 43 show a list of cloud storages and folders accessible by the first user and windows 42 and 44 show a list of data stored in a selected folder and accessible by the first user. Such an integrated cloud storage list of cloud storages, folders, and data may be shown with corresponding icons for better a visibility.

As shown in the diagram (a) of FIG. 4, window 41 shows a private folder selected by the first user. Upon the selection of the private folder, the first user may collectively see his or her data stored across different cloud storages (e.g., the first cloud storage and the second cloud storage), but sorted in the private folder. That is, window 42 shows data accessible by the first user in the private folder, but stored across different folders in the first and second cloud storages. For example, when the first user selects the private folder, the smart device of the first user shows the first data 1-1-1 in a first folder of the first cloud storage, the second data 1-1-2 in the first folder of the first cloud storage, a first data 1-2-1 in a second folder of the first cloud storage, a second data 1-2-2 in the second folder of the first cloud storage, a first data 1-3-1 in a third folder of the first cloud storage, a second data 1-3-2 in the third folder of the first cloud storage, and a first data 2-1-1 in a first folder of the second cloud storage.

As shown in the diagram (b) of FIG. 4, window 43 shows a public folder (e.g., a sharing folder) selected by the first user. Upon the selection of the public folder, the first user may collectively see his or her data stored across different cloud storages (e.g., the first cloud storage and the second cloud storage), but sorted in the public folder. That is, window 44 shows data accessible by the first user in the public folder, but stored across different folders in the first and second cloud storages. For example, when the first user selects the public folder, the smart device of the first user shows the first data 1-1-1 in a first folder of the first cloud storage, the second data 1-1-2 in the first folder of the first cloud storage, a first data 1-3-1 in a third folder of the first cloud storage, and a first data 2-1-1 in a first folder of the second cloud storage.

FIG. 5 illustrates an integrated cloud storage list displayed on a graphic user interface of a smart device in accordance with at least one embodiment.

As shown in FIG. 5, the graphic user interface includes two windows 51 and 52. Window 51 shows types of data and window 52 shows a list of data accessible by the first user. The types of data and the list of data may be shown with icons for a better visibility. Window 51 shows a music file selected by the first user from the types of data. Upon the selection, window 52 shows a list of music files accessible by the first user and stored across different cloud storages (e.g., first cloud storage and second cloud storage). For example, window 52 shows the first data 1-1-1 in the first cloud storage, the first data 2-1-1 in the second cloud storage.

Hereinafter, overall operation of a cloud storage service in accordance with at least one embodiment will be described with reference to FIG. 6 and FIG. 7.

Figure 6:
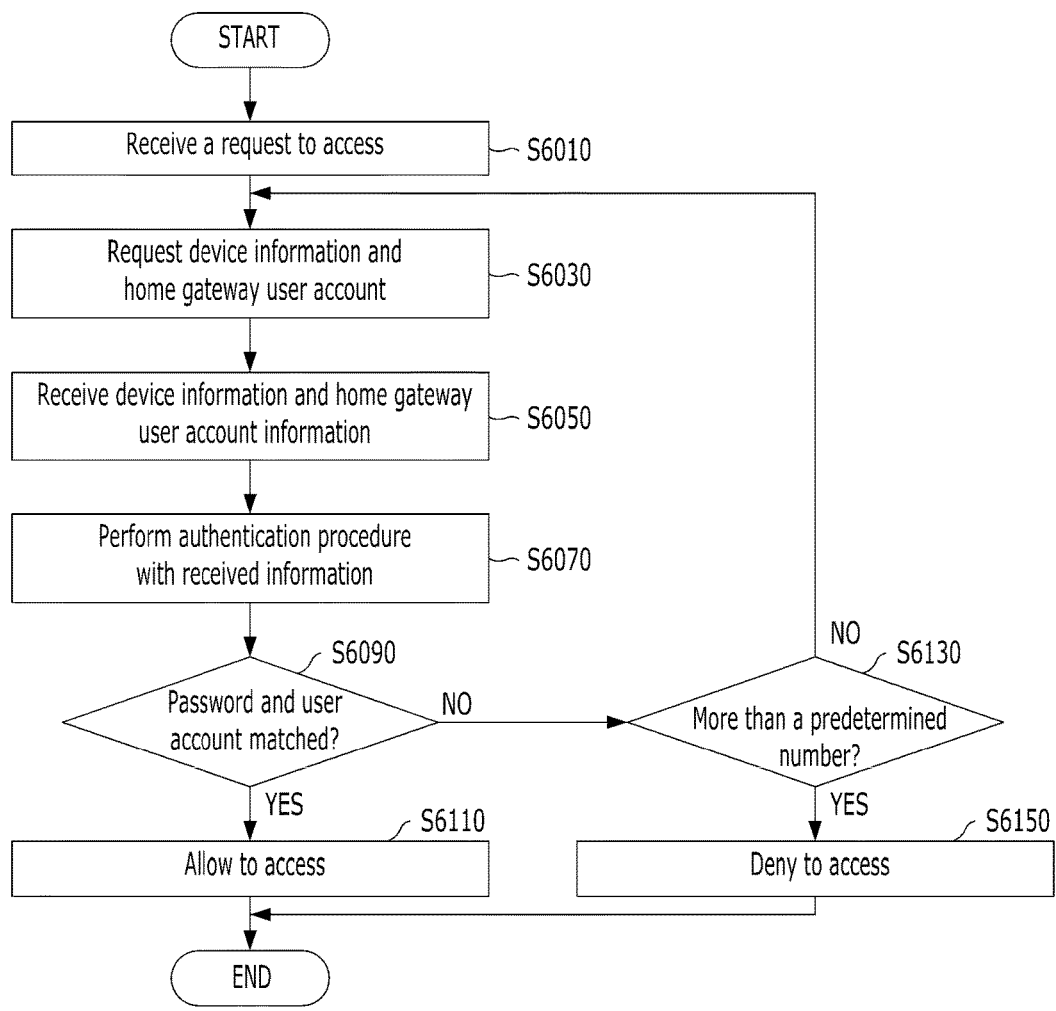
FIG. 6 illustrates accessing a home gateway in accordance with at least one embodiment.

FIG. 6 illustrates accessing a home gateway in accordance with at least one embodiment.

Referring to FIG. 6, home gateway 400 receives an access request message from smart device 300 at step S6010. At step 6030, home gateway 400 transmits a request message for device information and home gateway user account information to smart devices 301 to 304 in response to the access request message. At step 6050, home gateway 400 receives the requested device information (e.g., identification information) and the home gateway user account information from smart devices 301 to 304. At step 6070, home gateway 400 performs an authentication procedure based on the received information from smart device 300. At step 6090, home gateway 400 determines whether the home gateway account information received from smart devices 301 to 304 matches to home gateway account information stored in home gateway 400 in connection with identification information of smart device 300. For example, a home gateway user account and a corresponding password may be compared.

When the home gateway user account information is matched (Yes—S6090), home gateway 400 allows smart device 300 to access home gateway 400 at step S6110. When the home gateway user account information is not matched (No—S6090), home gateway 400 determines whether the authentication procedure fails more than predetermined times at step S6130.

When the authentication procedure fails less than the predetermined times (No—S6130), home gateway 400 may transmit the request message of the device information and the home gateway user account information again to smart device 200 at step S6030. When the authentication procedure fails more than the predetermined times (Yes—S6130), home gateway 400 may deny the access request of smart device 300 at step S6150.

Figure 7A:
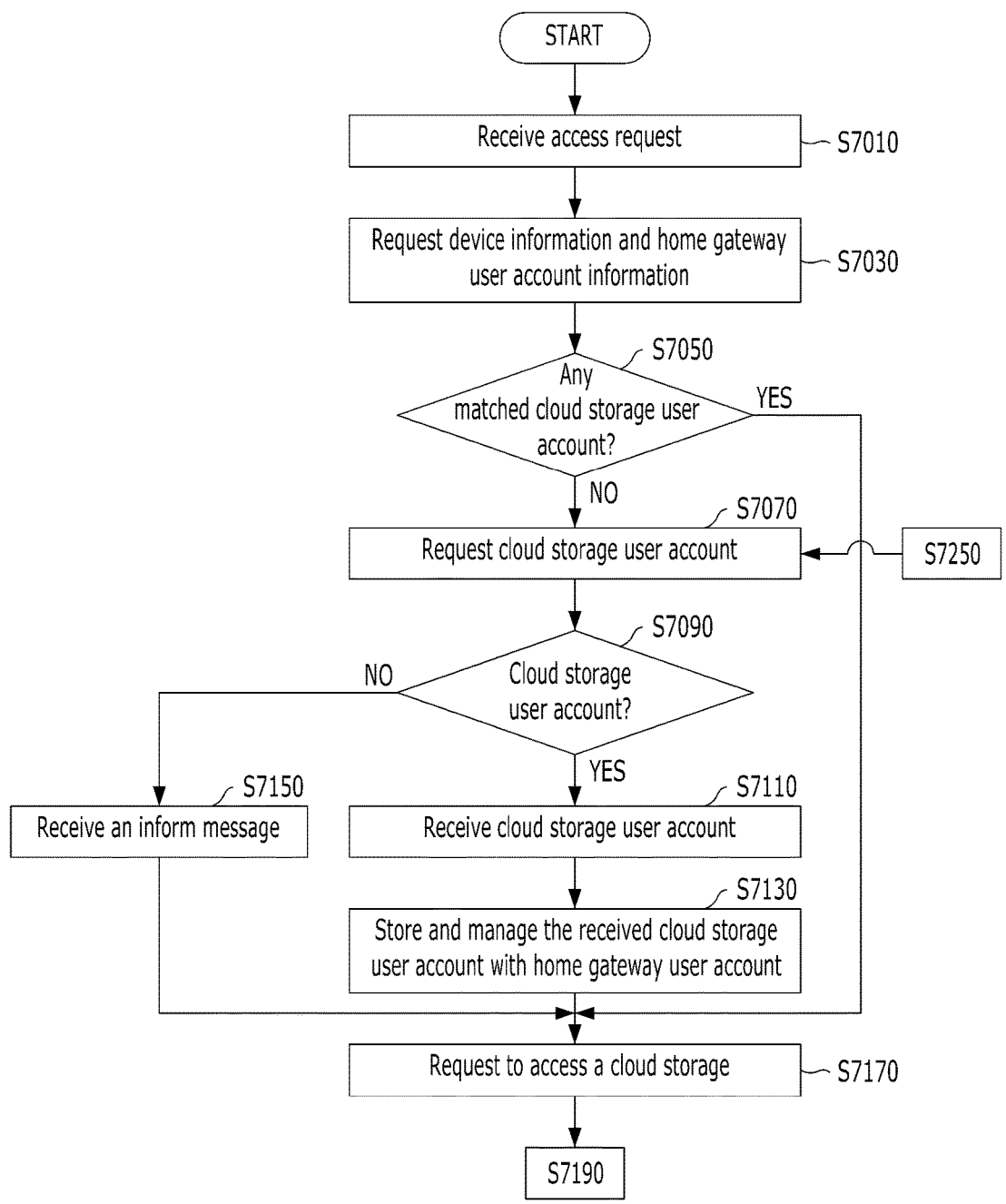
FIG. 7A, FIG. 7B, and FIG. 7C illustrate providing a cloud storage service through a home gateway in accordance with at least one embodiment.
Figure 7B:
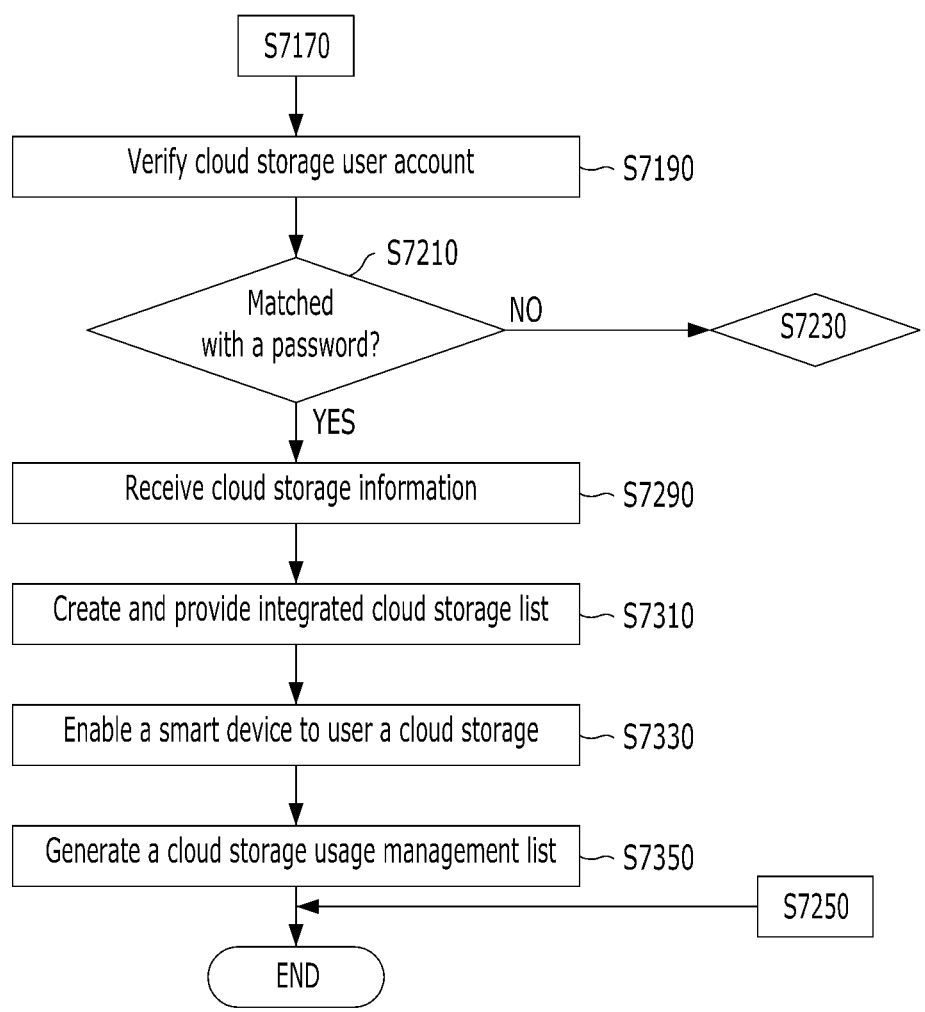
Figure 7C:
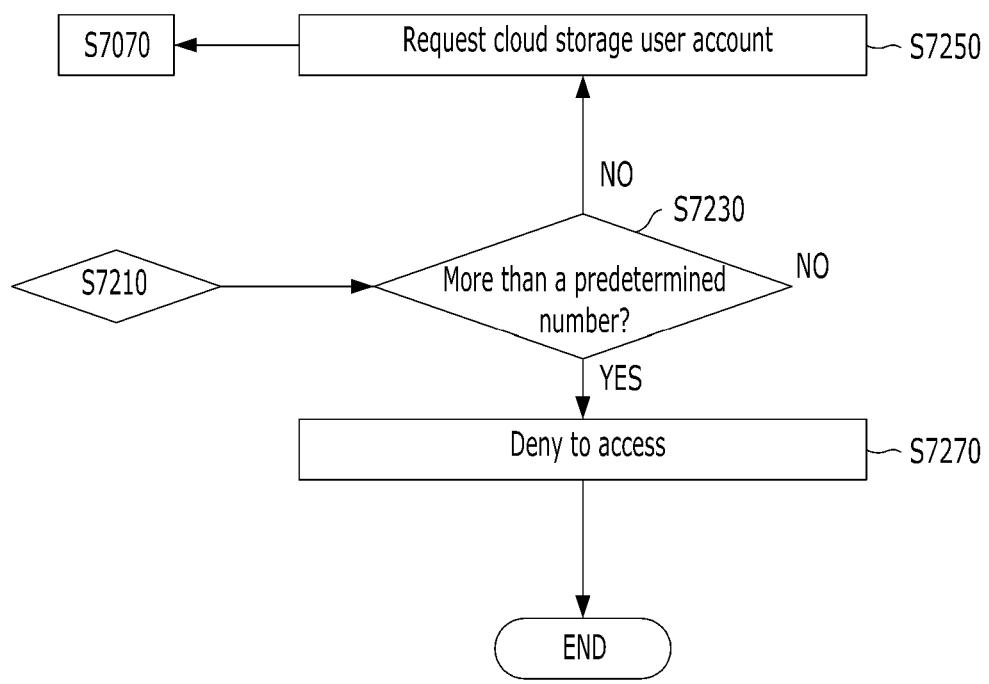

FIG. 7A, FIG. 7B, and FIG. 7C illustrate providing a cloud storage service through a home gateway in accordance with at least one embodiment.

Referring to FIG. 7A, home gateway 400 receives a cloud storage service request from smart device 300 at step S7010. In response to the cloud storage service request, home gateway 400 transmits a request message for device information and home gateway user account information to smart device 300 at step S7030. At step S7050, home gateway 400 determines whether a cloud storage user account matching the home gateway account of smart devices 301 to 304 is registered at home gateway 400 based on the received information upon the receipt of the home gateway user account information and the device information from smart device 300.

When the matched cloud storage user account is already registered (Yes—S7050), home gateway 400 may transmit a request message to corresponding cloud storage with the matched cloud storage user account information at step S7170.

When the matched cloud storage user account is not registered (No—S7050), home gateway 400 transmit a request message for cloud storage user account information to smart devices 301 to 304 and receive a response message from smart device at step S7070. At step S7090, home gateway 400 determines whether smart device 300 has corresponding cloud storage user account information based on the received response message.

When smart device 300 has the corresponding cloud storage user account (Yes—S7090), home gateway 400 may obtain the corresponding cloud storage user account from smart device 300 at step S7110. Smart devices 301 to 304 may directly provide a cloud storage user account stored in smart devices 301 to 304 to home gateway 400 or an associated user may be asked to input his or her cloud storage user account. Smart device 300 may generate the response message including the cloud storage user account information. Home gateway 400 may extract the corresponding cloud storage user account from the response message.

At step S7130, home gateway 400 may store the cloud storage user account from the user or smart devices 301 to 304, map the cloud storage user account with the device information and/or the home gateway user account of smart devices 301 to 304, and manage the cloud storage user account information with the home gateway user account information and/or the device information of smart device 300.

When smart device 300 does not have the corresponding cloud storage user account (No—S7090), home gateway 400 obtains cloud storage user account information registered with other user at step S7150. At step 7170, home gateway 400 may transmit a request message to corresponding cloud storage with the obtained cloud storage user account information of the other user at step S7170.

Referring to FIG. 7B, at step S7190, cloud storages 101 to 103 may receive the access request from home gateway 400. At step S7210, cloud storages 101 to 103 may perform an authentication process. For example, cloud storages 101 to 103 may compare user identification and a password in the access request with authentication information stored in cloud storages 101 to 103.

When the user identification and the password are matched (Yes—S7210), cloud storage 100 may provide cloud storage information to home gateway 400 at step S7290. The cloud storage information may include, a cloud storage name, a list of folders under a user's cloud storage user account, a folder permission on folders, a list of data under each folder, types of data, and/or folder permission on data. When cloud storages 101 to 103 do not provide the cloud storage information, home gateway 400 may generate and manage information regarding the folder permission on data and folders.

At step 7310, home gateway 400 may receive the cloud storage information from cloud storages under cloud storages 101 to 103, generate an integrated cloud storage list, as shown in FIG. 3, and send the integrated cloud storage list to smart devices 301 to 304. At step 7330, smart devices 301 to 304 may receive the integrated cloud storage list from home gateway 400. Smart devices 301 to 304 may further receive an input from the user for utilizing data stored in cloud storages 101 to 103 based on the integrated cloud storage list. The user may receive the integrated cloud storage list and select data on the integrated cloud storage list to utilize the cloud storages 101 to 103.

Referring to FIG. 7C, when the authentication process fails (No—S7210), cloud storages 101 to 103 may determine whether the authentication process fails more than predetermined times at step S7230. When the authentication process fails less than the predetermined times (No—S7230), cloud storages 101 to 103 may transmit another request to home gateway 400 asking for the cloud storage user account at step S7250. When the authentication process fails more than the predetermined times (Yes—S7230), cloud storages 101 to 103 may deny the access at step S7270.

When smart devices 301 to 304 accesses cloud storages 101 to 103 through home gateway 400, as shown in FIGS.

7(a), 7(b), and 7(c), home gateway 400 may generate and manage cloud storage usage information.

Hereinafter, sharing a cloud storage and protecting privacy in accordance with at least one embodiment with reference to FIG. 8.

Figure 8:
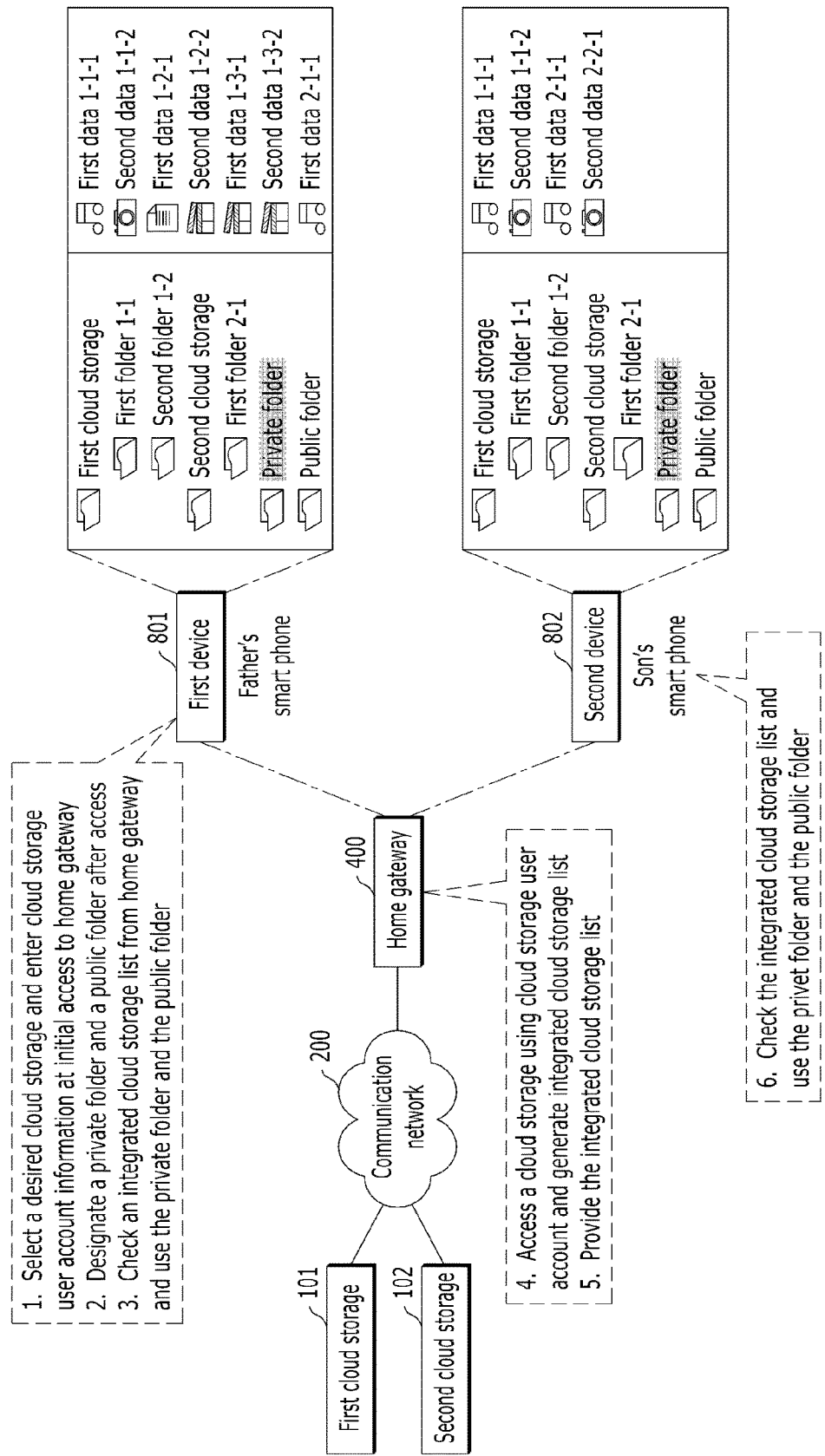
FIG. 8 illustrates a method of using a cloud storage through a home gateway in accordance with at least one embodiment.

FIG. 8 illustrates a method of using a cloud storage through a home gateway in accordance with at least one embodiment.

For convenience and ease of understanding, the method will be described under assumptions as follows. A father has first device 801 and his son has second device 802. Father has a cloud storage user account for accessing first cloud storage 101. The child has a cloud storage user account for accessing second cloud first cloud storage 10102. Father does not have a cloud storage user account for accessing second cloud storage 102. His son does not have a cloud storage user account for accessing first cloud storage 101.

Referring to FIG. 8, father sends a request to home gateway 400 for accessing first cloud storage 101 using first device 801. When first device 801 connects to home gateway 400 for the first time, father may select desired cloud storages and enter information for accessing first cloud storage 101. Since father may have the cloud storage user account for accessing first cloud storage 101, father may select first cloud storage 101 and input information on a cloud storage user account for accessing first cloud storage 101.

For example, father accesses first cloud storage 101 according to operations shown in FIG. 7. After accessing, father may set an access permission (e.g., sharing range) of data and folders to home gateway 400. For example, father may create a private folder and a shared folder (e.g., public folder). As shown in FIG. 3, father may set a folder permission of a folder 1-1 and a data permission of data stored in the folder 1-1 to be accessible by all users. Father may set a folder permission of a folder 1-2 to be accessible by only him. Father may set a data permission of data 1-3-1 stored in a folder 1-3 to be accessible by only adult users and a data permission of data 1-3-2 stored in the folder 1-3 to be accessibly by only him.

Such an access permission (e.g., folder sharing range) set by father may be stored in home gateway 400. Home gateway 400 may generate an integrated cloud storage list based access permissions (e.g., folder sharing range) stored under cloud storage user accounts.

As shown in FIG. 8, once the access permissions (e.g., folder sharing range) are stored, the integrated cloud storage list is generated, and smart devices 301 to 304 is connected to home gateway 400 for utilizing cloud storages 101 to 103, home gateway 400 may provide the integrated cloud storage list.

Accordingly, father may receive the integrated cloud storage list before accessing data stored in the private folder and the public folder. The son may also receive the integrated cloud storage list before accessing data in the private folder and the public folder.

Father may see his data and folders stored in first cloud storage 101 through first device 801. Father may further see the son's data stored in the public folder in first cloud storage 101.

First device 801 may show data accessible by all users including the data 1-1-1 and the data 1-1-2, data accessible by only father including the data 1-2-1, the data 1-2-2, and the 1-3-2, data accessible by only adult users including the data 1-3-1, and the data 2-1-1 which has been stored in second cloud storage 102 and set to be accessible by all users, as shown in FIG. 8.

Since father has the cloud storage user account for accessing first cloud storage 101, he may use his cloud storage user account stored in home gateway 404 for accessing first cloud storage 101 and utilizing data and folders stored in first cloud storage 101.

When father uses his smart device 801 to access home gateway 400, he may use a cloud storage corresponding to information on his smart device 801. When father uses his home gateway account to connect to home gateway 400, he may use a cloud storage corresponding to his home gateway account.

When father does not have a cloud storage user account for accessing second cloud storage 102, he may use cloud storage user accounts stored in home gateway 400, such as his son's cloud storage user account, for accessing the second cloud storage 102 and utilize data and folders stored in second cloud storage 102. When father uses his smart device 801, home gateway 400 may determine that his smart device 801 does not match his son's cloud storage user account and that his home gateway account does not match with his son's cloud storage user account. Thus, father may be restricted to access some folders and data in second cloud storage 102.

For example, father may be allowed to only access data stored in the public folder or data set to be shared with other users. Father may be restricted to use data stored in the private folder or data set to be accessible only by the son.

Smart device 802 may show data accessible by all users including the data 1-1-1, the data 1-1-2, and the data 2-1-1, and data accessible by the son including the data 2-2-1. Smart device 802 may further show, as explained above, the data 1-1-1, the data 1-1-2, the data 2-1-1, and the data 2-2-1.

Accordingly, father may be allowed to access data accessible by adult users and all users, but may be restricted to access the data 2-2-1. His son may be allowed to access his private data and data shared with all users, but may be restricted to access the data 1-2-1, the data 1-2-2, the data 1-3-2 and the data 1-3-1. In accordance with one embodiment, users may access his or her private data and shared data while protecting their privacy.

Hereinafter, using a cloud storage by a dummy device in accordance with at least one embodiment will be described with reference to FIG. 9.

Figure 9:
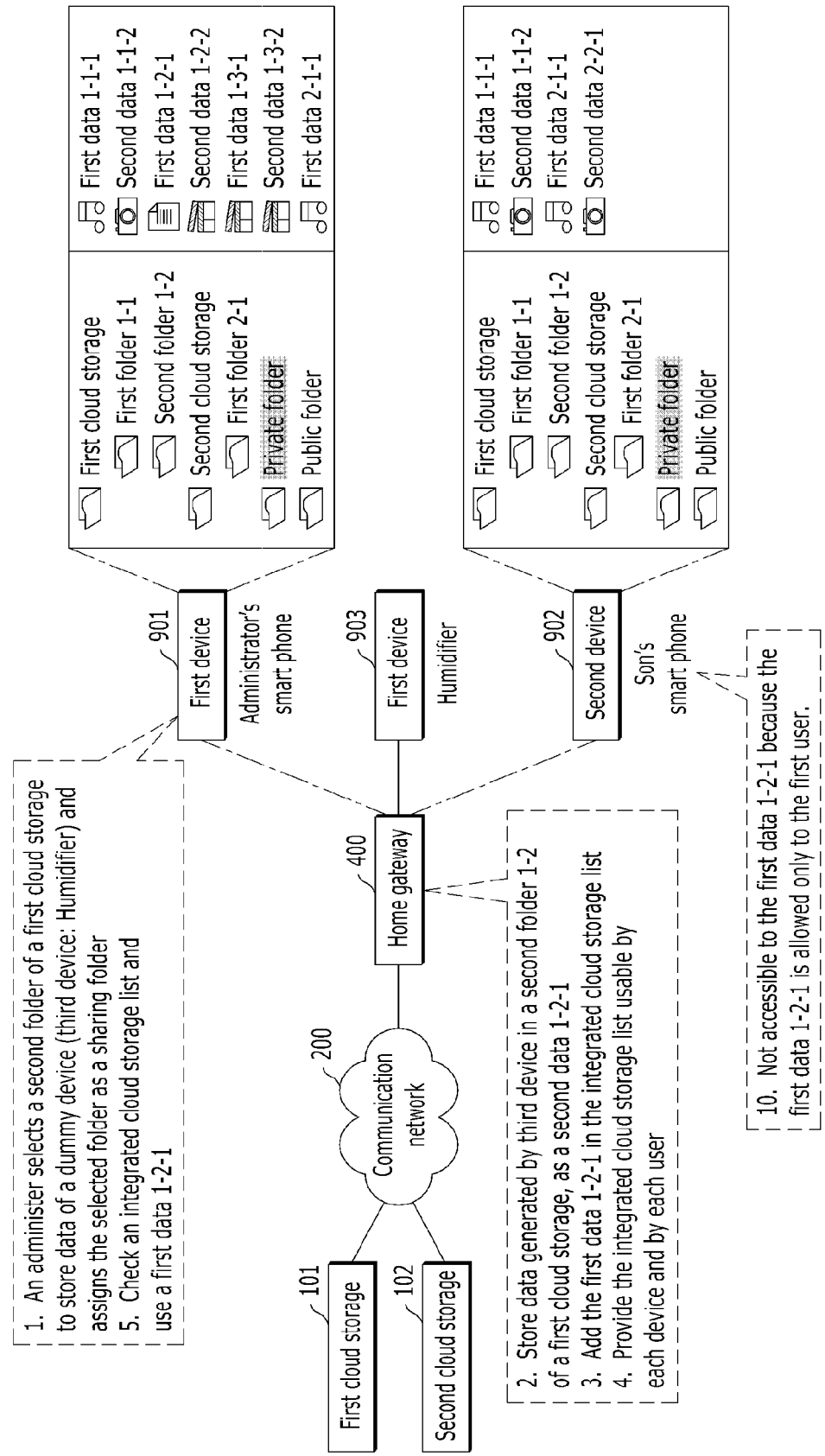
FIG. 9 illustrates a method of using a cloud storage by a dummy device through a home gateway in accordance with at least one embodiment.

FIG. 9 illustrates a method of using a cloud storage by a dummy device through a home gateway in accordance with at least one embodiment.

For convenience and ease of understanding, the method will be described under assumptions as follows. A first user, administer, is an adult user and a second user is child. First device 901 is a smartphone owned by the first user, second device 902 is a smartphone phone owned by the second user, and third device 903 is a humidifier. The third device 903 is a dummy device and incapable of directly storing data in or fetching data from a cloud storage.

The first user (e.g., an administrator) uses the first device 901 to access home gateway 400, selects a folder to store data collected by third device 903, and set an access perform for the selected folder. For example, the administrator (e.g., the first user) selects a folder 1-2 in first cloud storage 101 and sets the access permission of the selected folder 1-2 to allow only the first user (e.g., the administrator) to access the folder 1-2. Home gateway 400 collects data from third device 903 and stores the collected data as data 1-2-1. Home gateway 400 adds information on the data 1-2-1 to an integrated cloud storage list and provides the integrated cloud storage list to each user. In accordance with one embodiment, the data 1-2-1 is set to be accessible by only the first user. Thus, when only first user may access the data 1-2-1 when connecting to home gateway 400.

First device 901 may show the data 1-2-1, but second device 902 may not show the data 1-2-1. That is, only a user who has an access permission to the data 1-2-1 may view the data 1-2-1 on his or her smart devices 301 to 304.

Hereinafter, an operation for using a cloud storage through a home gateway without a cloud storage user account in accordance with at least one embodiment will be described with reference to FIG. 10.

Figure 10:
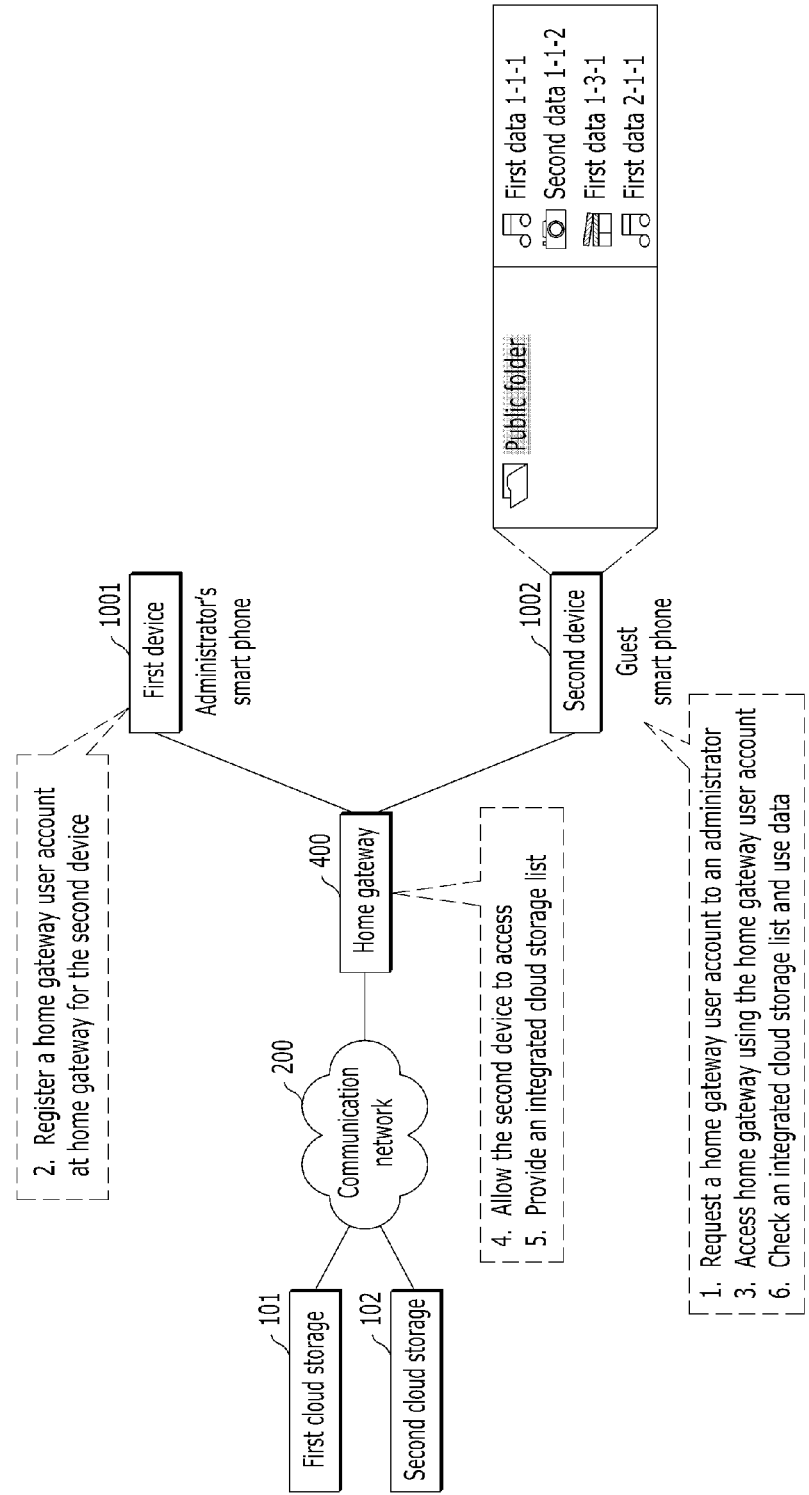
FIG. 10 illustrates a cloud storage service provided to a user without a cloud storage user account through a home gateway in accordance with at least one embodiment.

FIG. 10 illustrates a cloud storage service provided to a user without a cloud storage user account through a home gateway in accordance with at least one embodiment.

For convenience and ease of understanding, the method will be described under assumptions as follows. A first user is an adult and an administrator. A second user is an adult and a guest. First device 1001 is a smartphone owned by the first user and second device 1002 is a smartphone phone owned by the second user.

Since the second user is a guest, the second user does not have a home gateway account. In this case, second device 1002 transmits a request for a guest home gateway account to first device 1001. When first device 1001 receives the request for the guest home gateway account from second device 1002, first device 1001 may register second device 1002 to home gateway 400 for the guest home gateway account. First device 1001 may receive the guest home gateway account for second device 1002 from home gateway 400 and provide the guest home gateway account to second device 1002. Second device 1002 may receive the guest home gateway account from first device 1001 and connect to home gateway 400 using the guest home gateway account. Home gateway 400 may allow second device 1002 to access after authenticating the guest home gateway account of second device 1002. Home gateway 400 may determine that there is no cloud storage user account matching second device 1002 and use any of stored cloud storage user accounts for accessing a cloud storage. Home gateway 400 may generate an integrated cloud storage list for the second device 1002 and provide the integrated cloud storage list to second device 1002. Second device 1002 may only access shared data and public folders. Second device 1002 may be restricted from accessing data and folders stored in a cloud storage depending on sex or an age. Since the second user is an adult, second device 1002 may view the data accessible by adult users, as well as shared data and folders.

Referring to FIG. 10, second device 1002 may have access to data shared with other users and data accessible by only adults including data 1-301. Thus, second device 1002 may show data and folders shared with other users and data and folders accessible by only adults.

As described, home gateway 400 may allow a guest user without a home gateway account and a guest user without a cloud storage user account to access home gateway 400 and allows accessing shared data and public folders.

Hereinafter, providing a mass amount of storage space through a cloud storage service in accordance with at least one embodiment will be described with reference to FIG. 11.

Figure 11:
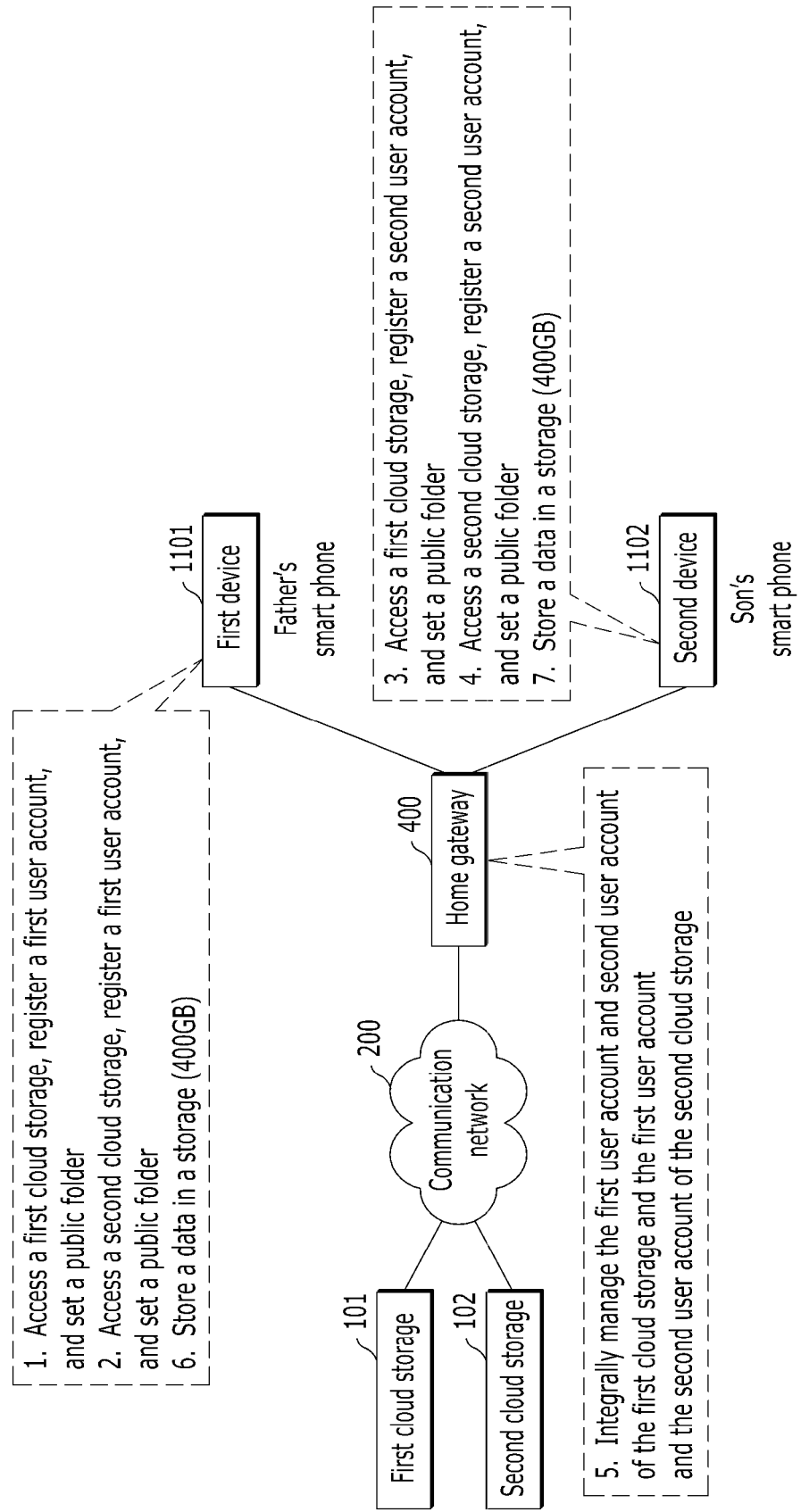
FIG. 11 illustrates a cloud storage service provided through a home gateway in accordance with at least one embodiment.

FIG. 11 illustrates a cloud storage service provided through a home gateway in accordance with at least one embodiment.

For convenience and ease of understanding, the method will be described under assumptions as follows. Father is a first user and has first device 1101. His son is a second user and has second device 1102. Father has a cloud storage user account for accessing first cloud storage 101 and second cloud storage 102. Father's available cloud storages in first cloud storage 101 and second cloud storage 102 are 100 gigabytes each. Son has a cloud storage user account for accessing first cloud storage 101 and second cloud storage 102. Son's available cloud storages in first cloud storage 101 and second cloud storage 102 are 100 gigabytes each as well.

Typically, the first user uses 100 gigabyte of first cloud storage 101 separately from 100 gigabyte of second cloud storage 102. The second user also uses 100 gigabyte of first cloud storage 101 separately from 100 gigabyte of second cloud storage 102. The first user is not allowed to combine cloud storages space of first cloud storage 101 and second cloud storage 102 together. The first user is not allowed to use the other user's cloud storages space either.

In accordance with one embodiment, the first user collectively manages cloud storage user accounts for accessing first cloud storage 101 and second cloud storage 102. The first user is allowed to combine and use cloud storages spaces available not only for the first user but also for the second user. Accordingly, the first user may use a total of 400 gigabytes of cloud storage spaces in first and second cloud storages 101 and 102.

Referring to FIG. 11, the first user uses first device 1101 to register cloud storage user accounts for accessing both first cloud storage 101 and second cloud storage 102 to home gateway 400. The first user sets a folder sharing range (e.g., access permission) on first cloud storage 101 and second cloud storage 102 to allow all users to access entire cloud storage space available to the first user.

The second user uses second device 1102 to register cloud storage user accounts for accessing both first cloud storage 101 and second cloud storage 102 to home gateway 400. The second user may set a folder sharing range (e.g., access permission) on first cloud storage 101 and the second cloud storage 102 to allow all users to access entire cloud storage spaces available to the second user.

Home gateway 400 may collectively manage both cloud storage user accounts for accessing first cloud storage 101 and the second cloud storage 102. Any smart devices accessing home gateway 400 may be allowed to access entire cloud storage space available to both the first user and the second user.

First device 1101 may access the cloud storage space available to the first user and the second user for first cloud storage 101 and the second cloud storage 102. Second device 1102 may access the cloud storage space available to the second user and the first user for first cloud storage 101 and second cloud storage 102.

Home gateway 400 may combine cloud storage spaces assigned as shared spaces and provide an interface for interacting with the combined cloud storage spaces. Users may conveniently access cloud storage spaces available to themselves or to other users.

All available cloud storage space may be assigned as spaces accessible by all users, but users may change a portion of his or her cloud storages for sharing and allow all users to access the portion of his or her cloud storages. For example, 10 gigabytes out of 100 gigabytes may be assigned as a private cloud storage, and the rest of 90 gigabytes may be shared spaces, summing a total of 360 gigabytes for shared spaces.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of providing an integrate cloud storage service through a home gateway communicating with smart devices through a first network formed by the home gateway and communicating with cloud storages through a communication network, the method comprising:
    obtaining, by the home gateway, information on cloud storage accounts associated with a smart device, as cloud storage account information, upon generation of a predetermined event associated with the smart device;
    accessing, by the home gateway, a plurality of cloud storages based on the obtained cloud storage account information and collecting information on each one of the plurality of the cloud storages and folders and data of each one of the accessed cloud storages, wherein the plurality of the cloud storages include a first cloud storage and a second cloud storage each provided by different service providers;
    generating, by the home gateway, an integrated cloud storage list including the collected information on each one of the accessed cloud storages and the folders and data of each one of the accessed cloud storages; and
    providing the generated integrated cloud storage list to the smart device.

2. The method of claim 1, wherein the obtaining information on cloud storage accounts associated with a smart device comprises:
    obtaining information on the smart device as device information and information on a home gateway account as home gateway account information upon receipt of an access request from the smart device; and
    fetching the cloud storage account information mapped to at least one of the device information and the home gateway account information from a memory.

3. The method of claim 1, wherein the obtaining of the information on the cloud storage accounts associated with a smart device comprises:
   requesting home gateway account information to the smart device upon receipt of an integrated cloud storage service request from the smart device;
   receiving the home gateway account information from the smart device in response to the request; and
   fetching cloud storage account information mapped to the received home gateway account information from a memory,
   wherein the received home gateway account information is different from home gateway account information mapped to device information of the smart device.

4. The method of claim 1, wherein the obtaining of the information on the cloud storage accounts associated with a smart device comprises:
   requesting the smart device to provide the cloud storage account information upon receipt of an access request from the smart device; and
   receiving the cloud storage account information from the smart device in response to the request.

5. The method of claim 1, wherein the obtaining of the information on the cloud storage accounts associated with a smart device comprises:
   determining whether the smart device has a home gateway account registered at the home gateway upon receipt of an access request;
   providing a guest account to the smart device in cooperation with an administrator smart device when the smart device has no home gateway account; and
   obtaining information on cloud storage accounts mapped to other smart devices having home gateway accounts registered at the home gateway from a memory as guest cloud storage account information.

6. The method of claim 5, wherein the generating comprises:
   accessing the cloud storages based on the guest cloud storage account information;
   collecting information on folders and data set with an access permission to allow anyone to access from the accessed cloud storages; and
   generating the integrated cloud storage list for a guest account to include the folders and data set with an access permission to allow anyone to access based on the collected information.

7. The method of claim 1, wherein the generating comprises:
   selecting, from the accessed cloud storages, the folders and data associated with an account holder of the accessed cloud storages;
   collecting information on the selected folders and data; and
   generating the integrated cloud storage list to include the selected folders and data based on the collected information.

8. The method of claim 7, wherein the selecting folders and data comprises:
   selecting, from the accessed cloud storages, the folders and data each having an access permission set to allow anyone to access; and
   selecting, from the accessed cloud storages, the folders and data each having an access permission set to allow the account holder of the accessed cloud storages.

9. The method of claim 1, wherein the integrated cloud storage list comprises information on at least one of a cloud storage name, a folder name, a folder permission, a data name, a data type, and a data permission of each of the folders and data of cloud storages accessible by the cloud storage account information.

10. The method of claim 1, comprising:
   receiving a user control request from the smart device after the providing the integrated cloud storage list;
   requesting at least one cloud storage to perform an operation based on the received user control request;
   receiving a response message from the at least one cloud storage as a result of performing the operation in response to the user control request;
   updating the integrated cloud storage list based on the response message; and
   transmitting a result message to the at least one smart device as a result of performing the requested operation.

11. A home gateway of providing an integrate cloud storage service, the home gateway configured to:
   obtain information on cloud storage accounts associated with a smart device, as cloud storage account information, upon generation of a predetermined event associated with the smart device;
   access a plurality of cloud storages based on the obtained cloud storage account information and collect information on each one of the plurality of the cloud storages and folders and data of each one of the accessed cloud storages, wherein the plurality of the cloud storages include a first cloud storage and a second cloud storage each provided by different service providers;
   generate an integrated cloud storage list including the collected information on each one of the accessed cloud storages and the folders and data of each one of the accessed cloud storages; and
   provide the generated integrated cloud storage list to the smart device.

12. The home gateway of claim 11, wherein the home gateway is configured to:
   obtain information on the smart device as device information and information on a home gateway account as home gateway account information upon receipt of an access request from the smart device; and
   fetch the cloud storage account information mapped to at least one of the device information and the home gateway account information from a memory.

13. The home gateway of claim 11, wherein the home gateway is configured to:
   request home gateway account information to the smart device upon receipt of an integrated cloud storage service request from the smart device;
   receive the home gateway account information from the smart device in response to the request; and
   fetch the cloud storage account information mapped to the received home gateway account information from a memory,
   wherein the received home gateway account information is different from home gateway account information mapped to device information of the smart device.

14. The home gateway of claim 11, wherein the home gateway is configured to:
   request the smart device to provide the cloud storage account information upon receipt of an access request from the smart device; and
   receive the cloud storage account information from the smart device in response to the request.

15. The home gateway of claim 11, wherein the home gateway is configured to:

determine whether the smart device has a home gateway account registered at the home gateway upon receipt of an access request;

provide a guest account to the smart device in cooperation with an administrator smart device when the smart device has no home gateway account; and obtain information on cloud storage accounts mapped to other smart devices having home gateway accounts registered at the home gateway from a memory as guest cloud storage account information.

16. The home gateway of claim 15, wherein the home gateway is configured to:

access the cloud storages based on the guest cloud storage account information;

collect information on folders and data set with an access permission to allow anyone to access from the accessed cloud storages; and generate the integrated cloud storage list for a guest account to include the folders and data set with an access permission to allow anyone to access based on the collected information.

17. The home gateway of claim 11, wherein the home gateway is configured to:

select, from the accessed cloud storages, the folders and data associated with an account holder of the accessed cloud storages;

collect information on the selected folders and data; and generate an integrated cloud storage list to include the selected folders and data based on the collected information.

18. The home gateway of claim 17, wherein the home gateway is configured to:

select, from the accessed cloud storages, the folders and data each having an access permission set to allow anyone to access; and select, from the accessed cloud storages, the folders and data each having an access permission set to allow the account holder of the accessed cloud storages.

19. The home gateway of claim 11, wherein the integrated cloud storage list comprises information on at least one of a cloud storage name, a folder name, a folder permission, a data name, a data type, and a data permission of each folders and data of cloud storages accessible by the cloud storage account information.

20. The home gateway of claim 11, wherein the home gateway is configured to:

receive a user control request from the smart device after the providing the integrated cloud storage list;

request at least one cloud storage to perform an operation based on the received user control request;

receive a response message from the at least one cloud storage as a result of performing the operation in response to the user control request;

update the integrated cloud storage list based on the response message; and transmit a result message to the at least one smart device as a result of performing the requested operation.

* * * * *